July 8, 1924.
W. MEHLHAF
AUTOMOBILE SIGNAL
Filed March 16, 1922
1,500,144
Fig. 1.
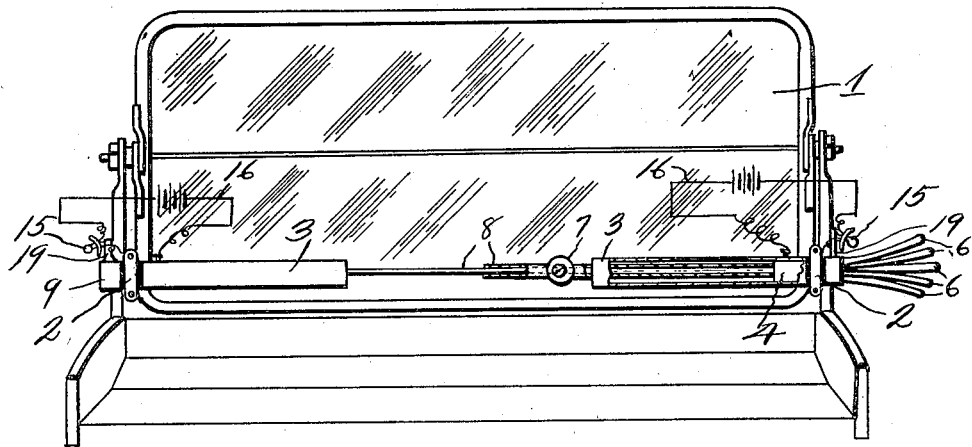
Fig. 6. Fig. 5.
Fig. 2.
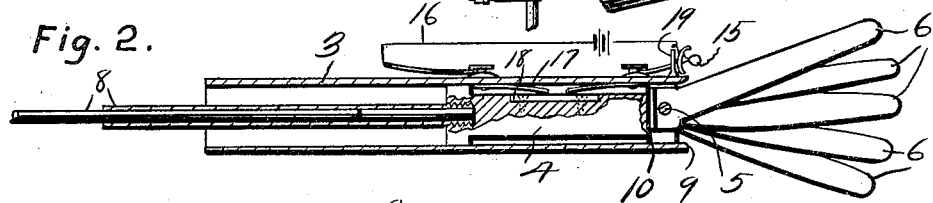
Fig. 3.
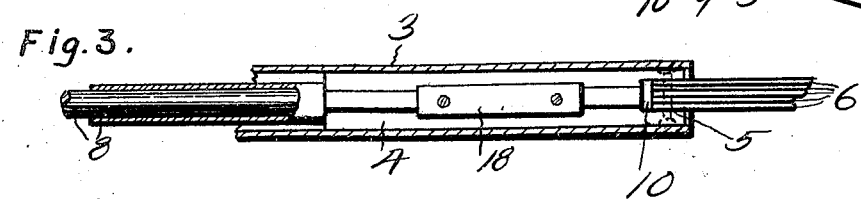
Fig. 4.
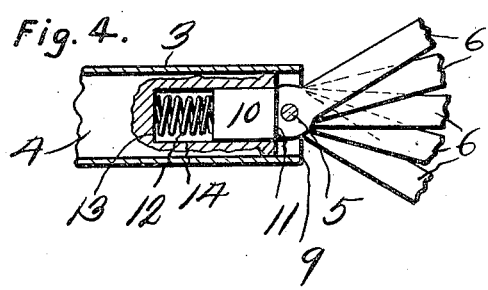
INVENTOR.
William Mehlhaf
BY
Philip A. H. Jerrell
ATTORNEY.

Patented July 8, 1924.

1,500,144

UNITED STATES PATENT OFFICE.

WILLIAM MEHLHAF, OF SUTTON, NEBRASKA.

AUTOMOBILE SIGNAL.

Application filed March 16, 1922. Serial No. 544,142.

*To all whom it may concern:*

Be it known that WILLIAM MEHLHAF, a citizen of the United States, residing at Sutton, in the county of Clay and State of Nebraska, has invented certain new and useful Improvements in Automobile Signals, of which the following is a specification.

The invention relates to vehicle direction indicators and has for its object to provide a device of this character of the fan type and comprising tubular shaped casings secured to the sides of a windshield and in horizontal axial alignment, said casing having slidably mounted therein rectangular shaped members, the inner ends of which are connected together by telescopically engaged members, which may be moved horizontally for forcing the fans outwardly to signalling position. Also to provide the slidable members with fan formed from pivoted members, which members have their rear sides flattened and engaged by spring actuated blocks, said blocks forming means for opening the fan.

A further object is to provide signalling lights adjacent the fan, which signalling lights are lighted when either of the fans are forced outwardly.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a rear view of a conventional form of windshield showing the signalling device applied thereto and partly in section.

Figure 2 is a vertical sectional view through one end of the signalling device.

Figure 3 is a horizontal sectional view through the outer end of one of the casings showing the slidable block therein.

Figure 4 is an enlarged detail view partly in section, showing the spring actuated block for opening the fans.

Figure 5 is a detail perspective view of adjacent portions of telescopically engaging members showing the means for adjusting the same in relation to each other.

Figure 6 is a sectional view through the casing and one of the slidable blocks, showing means for securing the same to a windshield.

Referring to the drawings the numeral 1 designates a conventional form of automobile windshield to which is secured by means of clamps 2 horizontally disposed and axially aligned casings 3, which are preferably formed from non-conductor material for preventing short circuiting of mechanism hereinafter set forth. Slidably mounted in the casings 3 are elongated members 4 to which are pivotally connected at 5 a plurality of blades 6 forming a fan when extended as shown in Figures 1, 2 and 4. When the elongated members 4 are pulled inwardly the blades 6 fold onto each other and pass into the casing 3, thereby removing the signal from position where it may be seen by approaching vehicles from the front or rear. When one of the elongated members 4 are forced outwardly by the operator grasping the handle member 7 which locks the telescopically engaged rod 8, the blades 6 as they pass out of the end 9 of each casing 3 will be forced to open position by engagement therewith of the block 10, which engages the straight sides 11 of the blades adjacent the pivotal point 5, said blocks being forced outwardly by means of the coiled spring 12 interposed between the inner wall 13 of the chamber 14 and the inner end of the block 10. It will be seen that the operator may move either signalling device out of either casing 2 for signalling approaching vehicles, as to his intentions of stopping, or turning to the right or left.

For night driving, electric lights 15 are provided, which lights are lighted by the closing of the circuit 16 through means of contact arms 17 which engage a plate 18 carried by the elongated member 4. The lights 15 are supported on arms 19 carried by the casings 3.

From the above it will be seen that a vehicle signal of the fan type is provided, which is simple in construction, the parts reduced to a minimum, and one may be easily installed on a vehicle without modifying the construction thereof.

The invention having been set forth what is claimed as new and useful is:—

1. A vehicle direction indicator comprising elongated casings axially aligned, elongated members slidably mounted in said casings, said elongated members being connected together, a plurality of arms pivotally connected to the elongated members and forming signalling fans, the inner ends of said members being provided with straight surfaces, said straight surfaces being in the same vertical plane when the fans are spread, slidable spring actuated blocks mounted in chambers of the elongated members and cooperating with said straight surfaces for opening the fans when forced out of the casings and a handle member whereby either of said elongated members may be moved.

2. A vehicle direction signal comprising a casing, an elongated slidable member mounted in said casing and having a chamber therein, a plurality of arms carried by the elongated member and pivoted together forming a signalling fan when forced out of the casing, a slidable block disposed in the chamber of the elongated member, a spring for forcing said block outwardly, said block cooperating with flat ends of the arms for spreading the arms in relation to each other and means whereby said elongated member may be moved longitudinally in the casing.

In testimony whereof I affix my signature.

WILLIAM MEHLHAF.